(12) United States Patent
Göktepe et al.

(10) Patent No.: US 12,113,631 B2
(45) Date of Patent: Oct. 8, 2024

(54) METHODS AND APPARATUSES FOR HANDLING RETRANSMISSIONS IN A WIRELESS TELECOMMUNICATIONS SYSTEM

(71) Applicant: KONINKLIJKE PHILIPS N.V., Eindhoven (NL)

(72) Inventors: Baris Göktepe, Berlin (DE); Martin Leyh, Erlangen (DE); Thomas Fehrenbach, Berlin (DE); Thomas Heyn, Erlangen (DE); Bernard Niemann, Erlangen (DE); Julian Popp, Erlangen (DE); Cornelius Hellge, Berlin (DE); Thomas Wirth, Berlin (DE); Thomas Schierl, Berlin (DE); Khaled Hassan, Laatzen (DE)

(73) Assignee: Koninklijke Philips N.V., Eindhoven (NL)

(*) Notice: Subject to any disclaimer, the term of this patent is extended or adjusted under 35 U.S.C. 154(b) by 398 days.

(21) Appl. No.: 17/440,321

(22) PCT Filed: Mar. 19, 2020

(86) PCT No.: PCT/EP2020/057644
§ 371 (c)(1),
(2) Date: Sep. 17, 2021

(87) PCT Pub. No.: WO2020/207746
PCT Pub. Date: Oct. 15, 2020

(65) Prior Publication Data
US 2022/0158777 A1    May 19, 2022

(30) Foreign Application Priority Data

Apr. 7, 2019    (EP) .................................... 19167717

(51) Int. Cl.
*H04L 1/1867*    (2023.01)

(52) U.S. Cl.
CPC ............ *H04L 1/1896* (2013.01); *H04L 1/188* (2013.01)

(58) Field of Classification Search
CPC ...... H04L 1/1896; H04L 1/188; H04L 1/1812
See application file for complete search history.

(56) References Cited

U.S. PATENT DOCUMENTS

2015/0117321 A1* 4/2015 Chen .................... H04L 1/0013
370/329
2016/0338096 A1* 11/2016 Vajapeyam ....... H04W 72/1268
(Continued)

FOREIGN PATENT DOCUMENTS

EP    1638238 A1    3/2006
GB    2465109 A8    5/2010
(Continued)

OTHER PUBLICATIONS

International Search Report and Written Opinion, International Searching Authority, Aug. 27, 2020, Application No. PCT/EP2020/057644.
(Continued)

*Primary Examiner* — Deepa Belur

(57) ABSTRACT

The embodiments herein relate to a method performed by UE, a UE, a network node or gNB and a method performed by the gNB for handling retransmissions in a wireless telecommunications system and resolving misalignment between the UE and the gNB. According to exemplary embodiments, there is provided a retransmission counter placed or implemented at the UE and/or the gNB which is configured to count every failing data packet (i.e., the receiver(s)/transmitters is/are informed via the NACK messages or the NACK timers). There is also provided a retransmission assignment indicator message configured to include, fully or partially: the content of said counter and the content or the structure of the CGB (Code Block Group), (Continued)

e.g., either all CBGs are retransmission versions or part of the CGBs are retransmission versions.

18 Claims, 4 Drawing Sheets

(56) References Cited

U.S. PATENT DOCUMENTS

| | | | |
|---|---|---|---|
| 2017/0187494 A1* | 6/2017 | Tirronen | H04L 1/1896 |
| 2018/0332500 A1 | 11/2018 | Wiberg et al. | |
| 2020/0374933 A1* | 11/2020 | Lou | H04W 74/0808 |
| 2021/0160919 A1* | 5/2021 | Wang | H04W 74/08 |
| 2023/0262664 A1* | 8/2023 | Mo | H04L 1/1825 370/328 |
| 2023/0292327 A1* | 9/2023 | Yue | H04W 76/27 |
| 2024/0008084 A1* | 1/2024 | Ye | A63B 21/065 |

FOREIGN PATENT DOCUMENTS

| | | | | |
|---|---|---|---|---|
| WO | WO-2012151953 A1 * | 11/2012 | | H04L 1/1685 |
| WO | WO-2022086683 A1 * | 4/2022 | | H04L 1/1812 |

OTHER PUBLICATIONS

Ericsson: "Handling UL LBT Failures, 3rd Generation", 3GPP Draft, R2-1901674, vol. RAN WG2, Feb. 14, 2019.
Samson: "Channel Access Procedures for NR-U, 3rd Generation Partnership Project", 3GPP, vol. RAN WG1, Mar. 29, 2019.

* cited by examiner

METHODS AND APPARATUSES FOR HANDLING RETRANSMISSIONS IN A WIRELESS TELECOMMUNICATIONS SYSTEM

CROSS-REFERENCE TO RELATED APPLICATION

This application is a national stage application, filed under 35 U.S.C. § 371, of International Patent Application No. PCT/EP2020/057644 filed on Mar. 19, 2020, and European Patent Application No. 19167717.8, filed Apr. 7, 2019, which are incorporated by reference herein in their entirety.

TECHNICAL FIELD

The present disclosure relates to the field of wireless communications, and in particular to methods and apparatuses for handling retransmissions in a wireless telecommunications system.

BACKGROUND

Automatic Repeat reQuest (ARQ) is an error control method for data transmission which uses acknowledgments and timeouts to achieve reliable data transmission. An acknowledgment or ACK is a message sent by the receiver to the transmitter to indicate that it has correctly received a data frame or packet. A timeout is a reasonable point in time after the sender sends the frame/packet. If the sender does not receive an ACK before the timeout, it usually retransmits the frame/packet until it receives an acknowledgment or exceeds a predefined number of re-transmissions. A variation of ARQ is Hybrid ARQ (HARQ), which has better performance, particularly over wireless channels.

HARQ operation modes can use incremental redundancy and Chase combining. By using HARQ, the user data can be transmitted multiple times. For each transmission or retransmission, either the same (Chase combining) or potentially a different redundancy version (incremental redundancy) is sent. When a corrupted packet is received, the receiver saves the soft information, requests a retransmission by sending a negative acknowledgement or NACK and later combines it with the already received soft information with the soft information conveyed in the retransmissions to recover the error-free packet as efficiently as possible. By doing so, it essentially accumulates the energy of all transmissions and retransmissions.

Consequently, a HARQ process takes care of the transmission of the first transmission and potential retransmissions at the sender side and the corresponding reception at the receiver side. In addition, the sender side process interprets the HARQ feedback and the receiver side generates the corresponding HARQ feedback according to the reception state.

In wireless communications, uplink transmissions may comprise configured grant transmissions and dynamic grant transmissions. A wireless device may be required to retransmit transport blocks to ensure that the transport blocks are received by a base station.

The following terminology is used herein:
Configured grants (CG) or pre-configured uplink resources (PUR) or Autonomous UpLink (AUL), where the UE is configured to transmit on (pre-) configured (predetermined) time frequency resources.
Configured Grants (CG): In the third Generation Partnership Project (3GPP) Release (Rel.) which defines a New Radio (NR) access technology, Configured Grants (CG) can be of Type 1 or Type 2, wherein:
Type 1: a wireless device or a User Equipment (UE) is configured with Radio Resource Control (RRC) messages (upper layer messages) to perform transmission on dedicated periodic resources starting at a timing offset;
Type 2: similar to Type 1 RRC signaling in addition to Layer 1 signaling (allowing the radio base station (or gNB) to activate and deactivate the CG).
Retransmissions, Automatic Repeat reQuest (ARQ), and Hybrid-ARQ (HARQ).
Transport Block (TB)-based HARQ: where a HARQ mechanism requests a repetition of an initial transmission or a new Redundancy Version (RV) of the initial transmission.
Code Block Group (CBG)-based HARQ: where the retransmission occurs only to one or more of the failed Code-Block-groups comprising the transmitted data (in a TB).
HARQ semi-static and dynamic codebooks.
HARQ block feedback: also known as HARQ with slide window or N-HARQ:
Where a length of feedback window with size of N Transport blocks acknowledge with one ACK if all TBs are correctly received. However, once the receiver detects one or more uncorrectable errors in the received data (in a whole TB for TB-based transmission or one or more CBs in a CBG-based transmission), it sends a NACK to inform the transmitter to send another redundancy version on the missed or failed data.
Negative acknowledgements referred to as NACK indicating error in reception, where the UE is requested to perform HARQ retransmissions.
Positive acknowledgements referred to as ACK, which acknowledge correct reception of data at the receiver.

The problem that the present disclosure addresses is a retransmission mechanism for configured grants, where retransmission is requested to occur within/at the configured transmission opportunities of an active configured grant. The problem may also occur when the retransmission is performed on dynamic grants indicated by the gNB for this particular retransmission. In this case, the following two implications may occur:

First implication: for CBG-based HARQ with feedbacks indicating one or more failing Code Blocks/CBGs If an ACK message failed to be received by a UE (due to a short Channel Occupancy Time (COT) length or due to unmanaged interference of another transmission, e.g., WiFi, or due to unmanaged channel effects), the UE may retransmit all the TB's CBGs assuming an all-NACK after a timer expires. This may cause reception delays or misaligned retransmissions at the gNB.

When a retransmission is requested with a NACK, where the NACK indicates one or more CBGs (but not all CBGs comprising a TB) and this NACK message fails (due to a short COT length or unmanaged interference as stated above), the UE (after a certain timer expires) may also assume an all-NACK and retransmit the whole CBGs as stated above.

If the Listen Before Talk (LBT) for a re-transmission itself fails at the UE, the UE may have to wait until a next possible Transmit Opportunity (TO) with a won LBT or a next possible gNB initiated COT specific for retransmission.

For the first implication illustration, see FIG. 1 and FIG. 2.

Referring to FIG. 1, a TB (Transmission Block) may be a TB-based where the whole TB is a code block. It may also be a multiple Code Block composing a Code Block Group (CBG). A TB is composed of multiple CBGs, where HARQ feedback may identify one or more CBGs for retransmission.

FIG. 1 shows a case with a short retransmission timer (Re-TX) (NACK (NK) assumed when no ACK received) timer. It shows a successful first transmission for TB1 at Transmit Opportunity 1 (TO1) and a successful ACK is received; it also shows an ACK failure for a correctly received TB2 (sent at TO2). The ACK failure may be due to a possible interference or the receiver (e.g. gNB) of the ACK (the UE) was busy with an LBT. It further shows that a new transmission at TO3 was not possible in time due to an LBT failure before at TO3

FIG. 1 also shows that the Re-TX timer expires (assuming a NACK) directly after TO3 and quite long before TB4. It shows one transmission not expected by the gNB at TO4, where a retransmission at TO4 (due to the Re-TX timer) including a retransmission of TB2 again (recall that TB2 successfully arrived at the gNB but was not successfully acknowledged (ACKed). P stands for periodicity.

The problem above may arise when the gNB has to ACK a previously ACKed TB2, while the expected TB3 (that was expected at TO3) was NACKed before ReTX of FB2.

FIG. 2 shows a similar consideration as FIG. 1; however, with a longer retransmission (Re-TX) timer assuming a NACK.

After TO2, at TO3, the transmission fails due to a failure in LBT. At TO4, the UE transmits a new TB3. The gNB fails to deliver an all-NACK for TB3 (may be due to LBT failure at gNB or interference). The UE, instead of retransmitting TB3, the UE follows the timer and transmits TB2 again (recall that the gNB already ACKed TB2 before and was not successful). The problem may arise when the UE fails to do retransmission of TB3 in time, or when the UE has to ACK an already ACKed TB2 later.

Second implication: for TB-based HARQ with a block feedback; i.e., where a length of a feedback window-size is "N" consecutive TBs that are only acknowledged with one ACK, i.e., if all TBs are correctly received. Otherwise, a NACK may be sent to indicate an error during the transmission window "N":

- If a block-ACK message is transmitted and the message itself failed (due to a short COT length or due to unmanaged interference of another transmission, e.g., WiFi, or due to unmanaged channel effects), the UE may start transmitting, starting from a first TB within the window with a of size N-TBs. This may cause delays and/or confusion (out of order or misalignment) at the gNB.
- When a retransmission is requested with a NACK, where the NACK indicates one TB/one last TB to be retransmitted, and where this NACK message fails (due to the aforementioned reasons), the UE may start transmitting, starting from the first TB within the window with a size of N-TBs. This may cause delays and/or misalignment (out of order) at the gNB.

In view of the above drawbacks, there is a need to solve the above problems. The solution describes a mechanism to harmonize and align HARQ retransmissions between a transmitter and a receiver.

Prior art document entitled: "Handling UL LBT failures", 3GPP DRAFT; R2-1901674, vol. RAN WG2, n. Athens, Greece; 14 Feb. 2019 (2019 Feb. 14), (source) ERICSSON, discloses issues and propose solutions to enhance Radio Link Failure (RLF) to combat Listen Before Talk (LBT) failures in the UL transmissions.

Prior art document entitled: "Channel access procedures for NR-U", 3GPP DRAFT; R1-1904406, FRANCE, vol. RAN WG1, no. Xi'an, China, 29 Mar. 2019 (2019 Mar. 29), source (SAMSUNG), discusses the design consideration for FR1 NR-U channel access, including the contention window size adaptation for CAT-4 LBT of NR-U, LBT for wide-band operation design, support for directional LBT, LBT with handshake mechanism, LBT for NR-U random access and some remaining issues for LBT design.

However none of the above cited documents provide a solution according to the present disclosure.

SUMMARY

The embodiments herein resolve the problem when a UE (e.g. a transmitter apparatus) is configured to perform or use Configured Grants (CG) and is requested to perform HARQ on the CGs, e.g., without dedicated retransmission grants. In this case, exemplary embodiments herein design a signaling (physical) mechanism to identify the retransmission sequences.

It is thus an object of the embodiments herein to provide methods and apparatuses, in the form of a transmitter apparatus and a receiver apparatus respectively, that resolve the aforementioned problems during a HARQ process in CG for operation in unlicensed frequency bands. The solution is also applicable to licensed operations under the control of the network node (e.g. a gNB or a radio base station). A transmitter apparatus may be a UE and a receiver apparatus may be a network node (or gNB) or vice versa. Hereinafter, a transmitter apparatus is referred to as a transmitter and a receiver apparatus is referred to as a receiver.

According to embodiments herein, there is provided a CG retransmission counter (CG-ReC) placed or implemented at a transmitter and/or at a receiver which is configured to count every failing data packet (i.e., the receiver(s)/transmitters is/are informed via the NACK messages or the NACK timers).

According to embodiments herein, there is also provided a retransmission assignment indicator (ReAI) message configured to comprise, fully or partially:

- The content of said counter (CG-ReC): e.g. the number of retransmissions or the number of new retransmission(s).
- The content or the structure of the CGB (Code Block Group): e.g., either all CBGs are retransmission versions or part of the CBGs are retransmission versions (in this case, it may indicate which parts are new transmissions (Tx) and which parts are retransmissions (ReTx).

According to exemplary embodiments herein, the signaling of the ReAI message, i.e., between a transmitter and a receiver or vice versa, may be performed using any of the following scenarios:

- without handshaking: where a transmitter (e.g., a UE), e.g., for each received NACK in the second approach or for each new initial transmission in the first approach shall increment/decrement/toggle the CG retransmission counter (CG-ReC) and signal back the ReAI message to its receiver.
- with handshaking: where both the transmitter and the receiver initialize and increment/decrement/toggle their CG-ReC, and then exchange ReAI signaling between them, e.g., via UpLink (UL) Control Information (UCI) and DownLink (DL) Control information (DCI).

The non-handshaking and the handshaking scenarios will be described in more detail in the detailed description of this disclosure.

An advantage with embodiments herein is to avoid HARQ misalignment and to resolve possible HARQ alignment between a transmitter and a receiver.

Additional advantages provided by the present disclosure will be readily derivable form the detailed description part.

BRIEF DESCRIPTION OF THE DRAWINGS

Examples of embodiments and advantages of the embodiments herein are described in more detail with reference to attached drawings in which.

DETAILED DESCRIPTION

Figure 1:
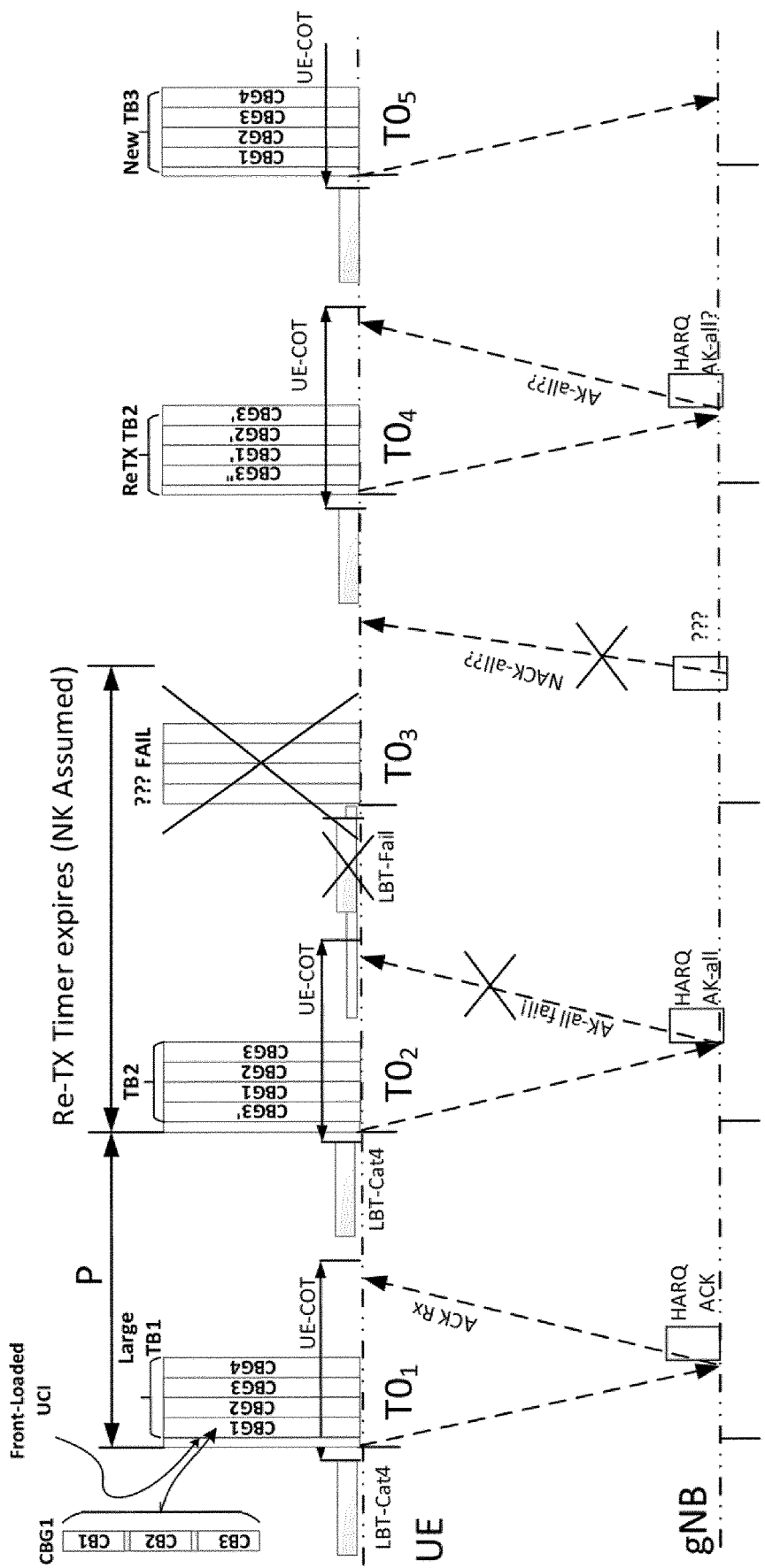
FIG. 1 depicts an exemplary scenario where a HARQ misalignment occurs due to LBT (Listen Before Talk) failure and wherein a short NACK timer is employed.
Figure 2:
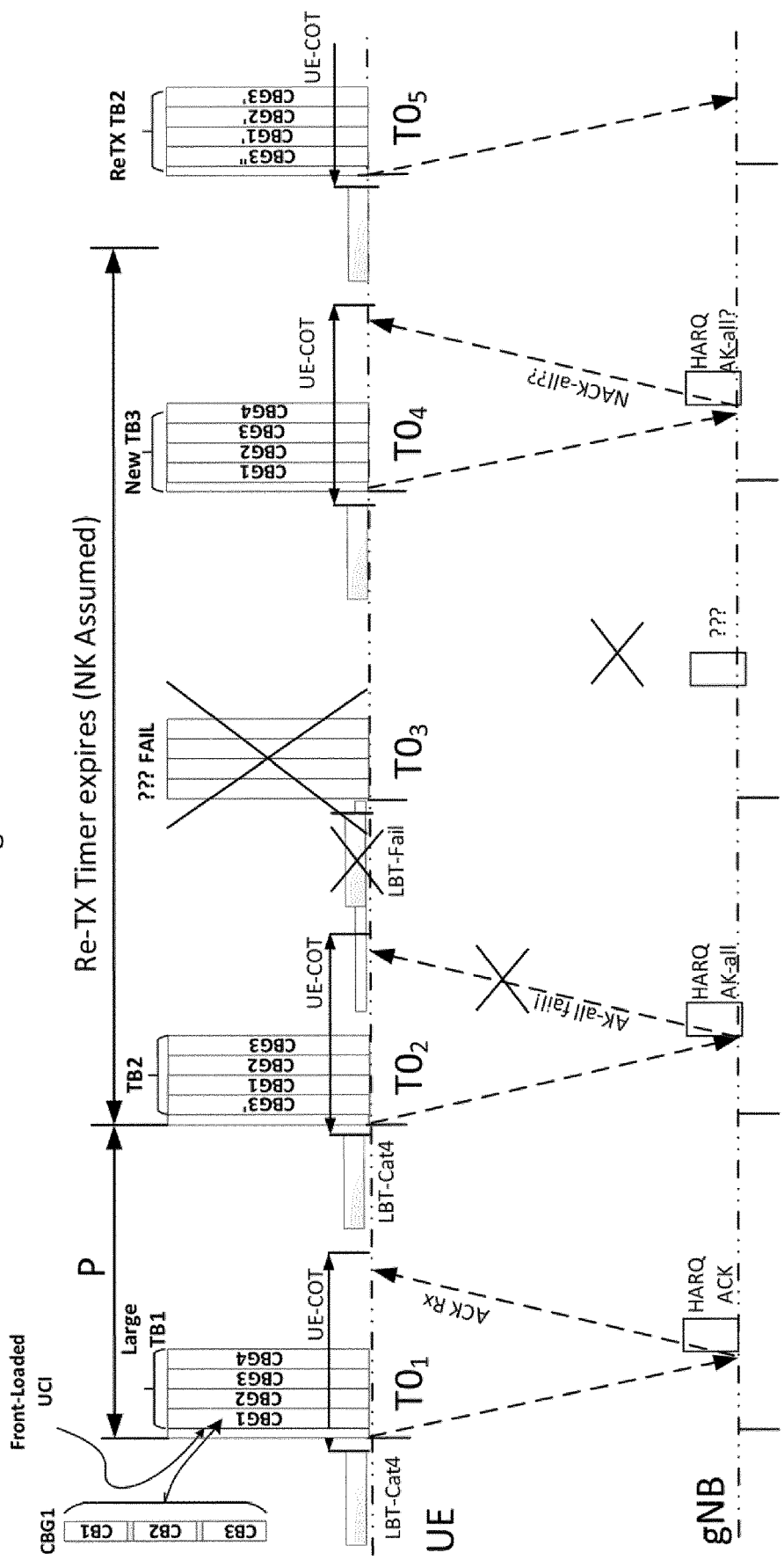
FIG. 2 depicts an exemplary scenario where a HARQ misalignment occurs due to LBT failure and wherein a longer NACK timer is employed as compared to FIG. 1.

In the following, is presented a detailed description of the exemplary embodiments in conjunction with the drawings, in several scenarios, to enable easier understanding of the solution(s) described herein.

As previously mentioned, exemplary embodiments herein provide a mechanism to harmonize and align HARQ retransmissions between a transmitter and a receiver. For this, the solution herein describes a dynamic mechanism to accommodate for retransmission of one Transport-Block (TB) as a whole code-block or a TB with multiple code block groups (CBG) (each of which has one or more code blocks (CB)).

Transmission of an initial version (or the first transmission version, also known as redundancy version number zero (RV0) is assumed to be sent on a configured grant (CG) with a time frequency resource, which incorporates a transmission opportunity (TO) (starts at an offset timeOffset), number of repetitions k, and a periodicity P.

The retransmission of each initial transmission (of a TB-based or a CBG-based TB) is resumed on the same configured grant, i.e., assuming either:

partial retransmission: only retransmitting the failing CBGs in addition to CBGs in the remaining CG resources, or full retransmission: allocating next CG resources with a retransmission redundancy version (or simple repetition) of the previous TB's all CBGs As previously described, there is provided a CG retransmission counter (CG-ReC) placed or implemented at a transmitter and/or at a receiver which is configured to count every failing data packet (i.e., the receiver(s)/transmitter(s) is/are informed via the NACK messages or the NACK timers). There is also provided a retransmission assignment indicator (ReAI) message configured to comprise, fully or partially:

The content of said counter (CG-ReC): e.g. the number of retransmissions or the number of new retransmission(s).

The content or the structure of the CGB (Code Block Group): e.g., either all CBGs are retransmission versions or part of the CGBs are retransmission versions (in this case, it may indicate which parts are new transmissions (Tx) and which parts are retransmissions (ReTx).

In the following, we describe the detailed design of the CG retransmission counter (CG-ReC) for both cases, with and without handshaking. Afterwards, we discuss the details of the retransmission assignment indicator (ReAI) and possible signaling design. Finally, misaligned HARQ procedure is discussed and also how to recover the misalignment.

1. Configured Grants Retransmission Counter (CG-ReC)

1.1 CG-ReC without handshaking between a transmitter (e.g. a UE) and a receiver (e.g. gNB or network node)

According to some exemplary embodiments herein, a mechanism without a handshaking comprises a design of the counter CG-ReC with may include a fixed number of bits, which number may be incremented (or decremented or toggled) every time according to one of the two possible options:

First approach: according to an embodiment, if a new packet is being transmitted, i.e., in this case, the CG-ReC may be either incremented or decremented if the transmitter or UE is configured to send a new transmission. Here the UE may be allowed to send a new transmission whether it has no NACK received or when a NACK is received but the new packet has higher priority or depending on the UE implementation and intentions. A packet may include one or more TBs. In this approach, the receiver or gNB will be aware whenever a new transmission is sent or be aware about the fact that it receives a new TB. However, if a retransmission occurs, said CG-ReC will not be changed and is maintained at the previous value. CG-ReC is configured to be kept as such for each new retransmission following a first transmission.

If a retransmission will follow a former retransmission, the CG-ReC is configured to be fixed. It will count up/down/toggle again once a new TB is transmitted i.e. a different TB.

Second approach: according to an embodiment, the CG-ReC is configured to be incremented/decremented/toggled if a NACK is received at the transmitter from its receiver. However, if an ACK is received by the transmitted, the CG-ReC is configured to be maintained unchanged until a next possible NACK reception. Once the maximum number of counts are reached or the number of counts reaches a predefined or pre-determined number of counts, said CG-ReC may be configured to toggle back (or automatically flipped back) to its initial value.

The following describes the initialization and setting of the CG-ReC at the UE.

The "First approach" is helpful in many scenarios, e.g., in a less reliable system when NACKs are occurring frequently, or the counter has more bits or more intentions is needed to follow a new transmission.

The "second approach" is helpful when the number of retransmissions are less, and few bits are supported by the counter flag/field.

According to an embodiment, the network node (or gNB) may indicate any of the schemes (approaches) as per signaling or RRC configurations (broadcast as such or dedicated) or preconfigured by the network or network node. According to another embodiment, either schemes may be selected dynamically by the network node or gNB based on the modes of operations and the environment conditions.

Additionally, the network or the gNB may indicate if the transmission is done with the "first approach" and the retransmission will take place in the same Configured Grants (where initial transmissions are indicated) or the retransmission takes place in one or more new dynamic grants or one or more new configured grants.

Additionally, the network node or the gNB may indicate if the transmission is done with the "second approach" and the retransmission will take place in the same Configured Grants (where initial transmissions are indicated) or the retransmission takes place in a new dynamic grant or new dynamic grants or new configured grants.

Procedure at the UE Side Only (Case No-Handshaking):
- For an UL CG, assuming that a gNB configures the UE with the CG configuration in addition to the ReAI initialization. This may be configured during the CG RRC messages or adapted/set via Layer 1 (L1)-signaling (e.g., via DCI).
- The length of the counter CG-ReC (if not informed by upper layers) may be configured by the network node or gNB (via RRC configuration message/field) to have one or more bits or is fixed as pre-configurations. According to an embodiment, the length of CG-ReC may also be derived directly from a ReAI initialization field in, e.g., RRC configurations.
- According to an embodiment, the transmitter or the UE may be configured to initialize the CG-ReC and/or the ReAI initial value to, e.g., all-zeros. It should be mentioned that the initialization values may be all-ones instead of all-zeros. These values are design parameters.
- In case if either the "First approach or the "Second approach" is identified to increment the CG-ReC by the transmitter UE, the UE is configured to increment said CG-ReC by 1 or more (depends if the counting criteria is performed on the TB level or based on the number of erroneous CBGs).

For No-Handshaking Case:
  In this case, the CG-ReC value may be used to align the gNB for detecting any misaligned HARQ retransmission/feedback if the CG-ReC value (partially or fully) is conveyed to the gNB using the ReAI signaling.
  Accordingly, the network node or gNB may recover from such a problem, i.e. misaligned HARQ retransmission/feedback by requesting an explicit retransmission with a new grant (e.g., following a gNB initiated COT).

For Handshaking Case:
  In this case and according to an exemplary embodiment, the CG-ReC may be initialized at both the transmitter (e.g., UE as described above) and the receiver (e.g., gNB). Hence, CG-ReC at the receiver may be incremented every time a received packet or data is decoded with uncorrectable errors. Moreover, the counter CG-ReC at the transmitter (e.g. the UE) may be incremented every time the transmitter (or UE) receives a NACK (in case of the second approach) or a new transmission is being transmitted (in case of the first approach) for each, e.g., TB-based block-HARQ or CBG-based HARQ transmission.

The following describes the procedure for initializing and setting the CG-ReC at the gNB and at the UE.
    1.2 CG-ReC procedure at the gNB and the UE (with handshaking)
      For an UL CG, it is assumed that the gNB configures the transmitter (or UE) with the CG configuration in addition to the ReAI initialization fields. This may be configured during the CG RRC messages or adapted/set via L1-signalling (e.g., via DCI).
      The length of the counter CG-ReC (if not informed by upper layers) may be configured by the gNB (via RRC configuration message/field) to have one or more bits. The counter CG-ReC may also be derived from the ReAI initialization field; hence, the length of the counter CG-ReC may be indicated in the ReAI initialization as well (assuming handshaking is applied).
      At the receiver (or gNB):
        According to an embodiment, the CG-ReC counter may be incremented (decremented) every time the receiver (gNB) detects an uncorrectable error in a received packet and, at the same time, the receiver intends to send a NACK back to the transmitter (UE);
        According to an embodiment, the receiver (gNB) may be configured to signal in, e.g., the DCI, a signaling field (ReAI) comprising (partially or fully) the incremented CG-ReC value (in case of decoding errors) or the same previous counter value (in case of correct reception) to the transmitter (UE);
        According to an embodiment, the receiver (gNB) may be configured to compare the received transmitter (UE) CG-ReC value (or derived counter value) from the ReAI received in, e.g., UL control information;
        According to an embodiment, based on the receiver (gNB) internal CG-ReC and the transmitter (UE) conveyed CG-ReC value, a HARQ misalignment resolution may be performed in case of a mismatch of the two CG-ReC values.

It should be noted that a resolution procedure may be a straightforward procedure in case: if e.g. ReAI indicates the "transmission id" and the retransmission is identified to be transmitted for in new dynamic grant(s). In this case, the gNB may be configured to provide to the UE a grant with the identified transmission id (in ReAI) for the retransmission.

At the transmitter (UE) side:
        According to an embodiment, the transmitter (UE) is configured to increment the CG-ReC counter whenever a NACK is received from its intended receiver (gNB or network node).
        According to an embodiment, the transmitter is configured to generate a ReAI signaling to be informed to the receiver via, e.g., UCI conveying the value of UE's CG-ReC (partially or fully).
        According to an embodiment, the transmitter (UE) is configured to compare the counter signaling field (or the derived counter value) of its receiver, i.e., conveyed in the ReAI, to the UE's internal incremented CG-ReC.
        Based on the transmitter's (UE) internal CG-ReC and the receiver's (gNB) conveyed CG-ReC value, a HARQ misalignment resolution may be performed in case of a mismatch of the two CG-ReC values.

2. Retransmission Assignment Indicator (ReAI or RAI) Signaling

The value of the counter CG-ReC at each instant of time may decide/assign (partially/fully) the value of the ReAI signaling itself.

According to an embodiment, in case of a no-handshaking operation, the ReAI may be signaled back from the transmitter (e.g. UE) to the receiver (e.g. gNB) on each successful transmission/retransmission opportunity (TO) of the CG, e.g., via an UCI in case of no-handshaking.

Additionally, in case of a handshaking option, and according to an embodiment, the ReAI may also be signaled once more from the receiver (e a gNB) to the transmitter (a UE) on, e.g., the DCI or together with each ACK/NACK.

For UCI design, it is advantageous to have the UCI front loaded to efficiently detect misaligned HARQ retransmissions early at the gNB.

The following comprises a design of the ReAI signaling in accordance with some embodiments herein.

Design of the Signaling Field of the ReAI

In case when handshaking is not supported, the transmitter (UE) is configured to send, e.g., a UCI carrying the retransmission indicator ReAI, where the retransmission indicator may include one or more bits; which may be designed as follows and in accordance with some embodiments herein:

If one bit is indicated from RRC signaling or by upper layers, the UE may be configured to allocate one bit indicating the transmission status as follows:
  If Zero (and e.g., initially set to zero), then it is a new transmission on the used transmission opportunities (TOs);
  If a NACK is indicated and received by the transmitter UE and the UE has to perform retransmission, the UE may be configured to toggle the field to 1 (e.g., if one bit is used) and may be configured to signal ReAI comprising, e.g., the value "1" indicating a retransmission.
If more than one bit is indicated, some bits may be toggled/incremented on every NACK retransmission and the other bits may indicate either partial transmission or full retransmission (e.g., 11).
  For example (at least for the second approach described earlier): the bits may include the CG-ReC counter on, e.g. the Least Significant Bits (LSBs) and said bits may include a partial/full retransmission indicator on, e.g., Most Significant Bit (MSB) (or vice versa), as shown in the following examples:

| ReAI value | MSB → e.g., CG-ReC | LSB → partial/full transmission |
|---|---|---|
| 0000 | 00 → CG-ReC indicates no change/ACK received/no NACK assumed | If ReAI did not change, then new transmission |
| 0101 | 01 → CG-ReC counts one error | second ReAI counter; 01 Re-TX of CBG1/2 |
| 1011 | 10 → CG-ReC counts the 2nd error | third ReAI counter; 11 Re-TX of CBG1/2/3 |
| 1111 | 11 → CG-ReC counts the 3$^{rd}$ error | Fourth ReAI counter; 11 full Re-TX or CBG1/2/3/4 |

From the table, the first two most significant bits (MSB) indicate which of the ReAIs is transmitted in the least significant bits (LSB). This indicates to which CG the ReAI is associated to. In the table, we assume that there are 4 CGs that can be addressed by the MSBs and in combination with the second part (LSBs), the network node or gNB knows which CBGs of the CG indicated in the MSBs is/are transmitted.

As an example, in the following entry the first two bits 01 (MSBs) indicate the number of errors, which in this example is one error. This means the number of CBG(s) that is retransmitted in the same transmission where these bits are sent. The second two bits 01 (LSBs) represent the ReAI counter which is e.g. incremented whenever a new transmission is sent (possibly together with some retransmission(s)). If the counter does not change, then the current transmission includes only retransmission(s). This way the network node or gNB can determine that it lost a transmission (because the ReAI is incremented by 2, which means that the gNB lost the transmission where it was incremented by 1). The term second ReAI counter refers to the possible values that these bits can take.

| 0101 | 01 → CG-ReC counts one error | second ReAI counter; 01 Re-TX of CBG1/2 |
|---|---|---|

For the first approach described earlier, another table may be designed as well considering the fact that the CG-ReC will be the same in case of retransmission and will toggle/increment/decrement in case of new transmission.

More granularity and more options may be defined by more bits; e.g., 6, 8, . . . bits More bits may have the configured grant (CG) periodicity shorter than the retransmission timer (NACK timer)

If the UE and the gNB are configured to follow the handshaking procedure as elaborated previously:
The gNB in this case:
  If the first approach is selected: the gNB may be configured to send the ReAI, e.g., if it is required to do so, e.g., every ACK/NACK, where the ReAI counter is incremented every ACK and kept the same every NACK.
  If the second approach is selected: the gNB is configured to send the ReAI, e.g., if it is required to do so, e.g., every time the gNB transmits a NACK, a ReAI comprising the toggled/incremented CG-ReC.
The UE response in this case:
  If the first approach is selected: the UE may be configured to keep the counter part in the ReAI unchanged, and the UE will do retransmission (following a NACK indicated by the gNB or a when the NACK timer expires). However, the UE may be configured to increment the counter every time the UE performs a new (initial) retransmission.
  If the second approach is selected: Once the UE receives the NACK or a NACK timer expires, the UE is configured to increment its CG-ReC and is further configured to compare it to the received CG-ReC received from e.g. the gNB and the UE is configured to send a UE ReAI on the UCI.

Retransmission may be allocated by the gNB as a kind of dynamic grants; or configured by the gNB and produced by the UE allocating the same configured grant(s) or a/new configured grant(s).

For Dynamic Grants Retransmission Allocation Procedure:

According to some exemplary embodiment, it is also possible to provide dynamic grants (by, e.g., gNB) for requesting a retransmission (of a specific TB or CBG) without reusing already configured CG resources for that purpose. In this scenario, the ReAI or RAI transmitted by the UE is reinterpreted as a transmission indicator or a retransmission indicator. However, the ReAI is not transmitted in case the UE is configured to decide to skip or not use a CG occasion because e.g. no data is available.

For requesting the retransmission, the gNB may be configured to provide also this retransmission indicator in the DCI scheduling a specific dynamic grant for the retransmission, such that the UE knows which transmission is requested by the gNB. The UE may then be configured to retransmit the transmission only on the resource given in the dynamic grant without reusing the CG resources.

For Configured Grants Retransmission Allocation Procedure:

The UE may be configured to allocate existing configured grants with the indicated (after a NACK or a NACK timer expires) retransmission of a specific TB or CBG. The UE may be adapted to allocate also another configured grant configured for retransmission or to be used by the UE for other transmission.

HARQ Misalignment Procedure

According to an embodiment herein, the transmitter (UE) may be configured to signal back in the ReAI its incremented CG-ReC if the counters at both sides (transmitter (UE) and receiver (gNB)), after comparison, are matching.

Otherwise, a HARQ misalignment resolution and procedure may comprise actions on the transmitter (UE) side and other actions on the receiver (gNB) side.

For the transmitter side (UE), the UE may be configured to send either:
A failure ReAI value which is specified at both sides, or
Increment and send (a mismatched) ReAI value to trigger the receiver (gNB) to resolve the misalignment.

For the receiver side (gNB), after triggering by the transmitter (UE) indicating a specified ReAI failure indication or ReAI with a mismatched value(s), the receiver (gNB) may be configured to recover/resolve the misaligned HARQ by, e.g.:
new dynamic grants (following a gNB initiated Channel Occupancy Time (COT) or in the same COT if allowed)
new allocations in a new CG or a parallel active CG.

As previously described, there is also provided methods performed by the UE (transmitter) according to previously described embodiments.

A method performed by a transmitter apparatus e.g. a UE, is presented below.

The UE is provided with a retransmission counter, CG-ReC, which is configured to count every failing data packet (i.e., the transmitters/are informed via the NACK messages or the NACK timers). The UE may further comprise a retransmission assignment indicator (ReAI) which may be signaled.

According to an exemplary embodiment (first approach), the method performed by the UE may comprise (in the case of no-handshaking as previously described):
Incrementing/decrementing/toggling the CG retransmission counter, when a new packet is being transmitted and when a retransmission occurs; maintaining said counter at its previous value, and if a retransmission follows a new retransmission maintaining the counter at its previous value, and incrementing/decrementing the counter once a new packet is transmitted.

According to another embodiment (second approach), a method performed by the transmitter (UE) may comprise (in the case of no-handshaking as previously described): incrementing/decrementing said counter if a NACK is received from a receiver. The method further comprising, if an ACK is received, maintaining said counter unchanged until a next possible NACK reception. The method further comprises, once a maximum number of counts is reached or the number of counts reaches a predefined or pre-determined number of counts, toggling said counter back (or automatically flipping said counter back) to its initial value.

According to an embodiment, in case of no-handshaking, the method performed by the UE includes initializing the counter and the ReAI initial values to predefined values (e.g.

all zeros). The method further comprises, conveying the counter value to the network node (or gNB) using the ReAI signaling.

The method may further comprise, in the handshaking case, incrementing said counter every time said UE receives a NACK (in case of the second approach) or a new transmission is being transmitted (on case of the first approach). According to an embodiment, the method may comprise incrementing the counter whenever a NACK is received from the gNB or the network node. The method may further comprise, generating a ReAI signaling to be informed to the receiver via UCI conveying the value of said counter. The method may further comprise, comparing a counter signaling field or a derived counter value conveyed in the ReAI to the UEs internal incremented counter. The method further comprise, resolving misalignment in case of a mismatch of the two counter values as a result of the comparison.

In case of no-handshaking, the method performed by the UE may comprise, signaling back the ReAI to the receiver (or gNB) on each successful transmission/retransmission opportunity (TO) of the channel grant, via e.g. UCI. The method may comprise allocating one bit indicating the transmission status as follows:
If Zero (and e.g., initially set to zero), then it is a new transmission on the used transmission opportunities (TOs);
If a NACK is indicated and received by the transmitter UE and the UE has to perform retransmission, hence, the method comprises toggling the field to 1 (e.g., if one bit is used) and signaling to the gNB the ReAI comprising, e.g., the value "1" indicating a retransmission.
As previously described if more than one bit is indicated, some bits may be toggled/incremented on every NACK retransmission and the other bits may indicate either partial transmission or full retransmission (e.g., 11).
For example (at least for the second approach described earlier): the bits may include the CG-ReC counter on, e.g. the Least Significant Bits (LSBs) and said bits may include a partial/full retransmission indicator on, e.g., Most Significant Bit (MSB) previously described.

According to an embodiment, if the first approach is selected, the method by the UE comprises keeping the counter part in the ReAI unchanged and performing a retransmission (following a NACK indicated by the gNB or a NACK timer expires). However, the method may further comprise incrementing the counter every time the UE performs a new (initial) retransmission.

According to an embodiment, if the second approach is selected: Once the UE receives the NACK or a NACK timer expires, the method comprises UE incrementing the CG-ReC and comparing it to the received CG-ReC received from e.g. the gNB and sending a UE ReAI on the UCI to the gNB.

According to an embodiment, and as previously described in section "HARQ misalignment procedure", the method may comprise transmitting, by the UE, a failure ReAI value which is specified at both sides, or incrementing and sending (a mismatched) ReAI value to trigger the receiver (gNB) to resolve the misalignment. Additional actions performed by the transmitter or the UE have already been described and need not be repeated.

Figure 3:
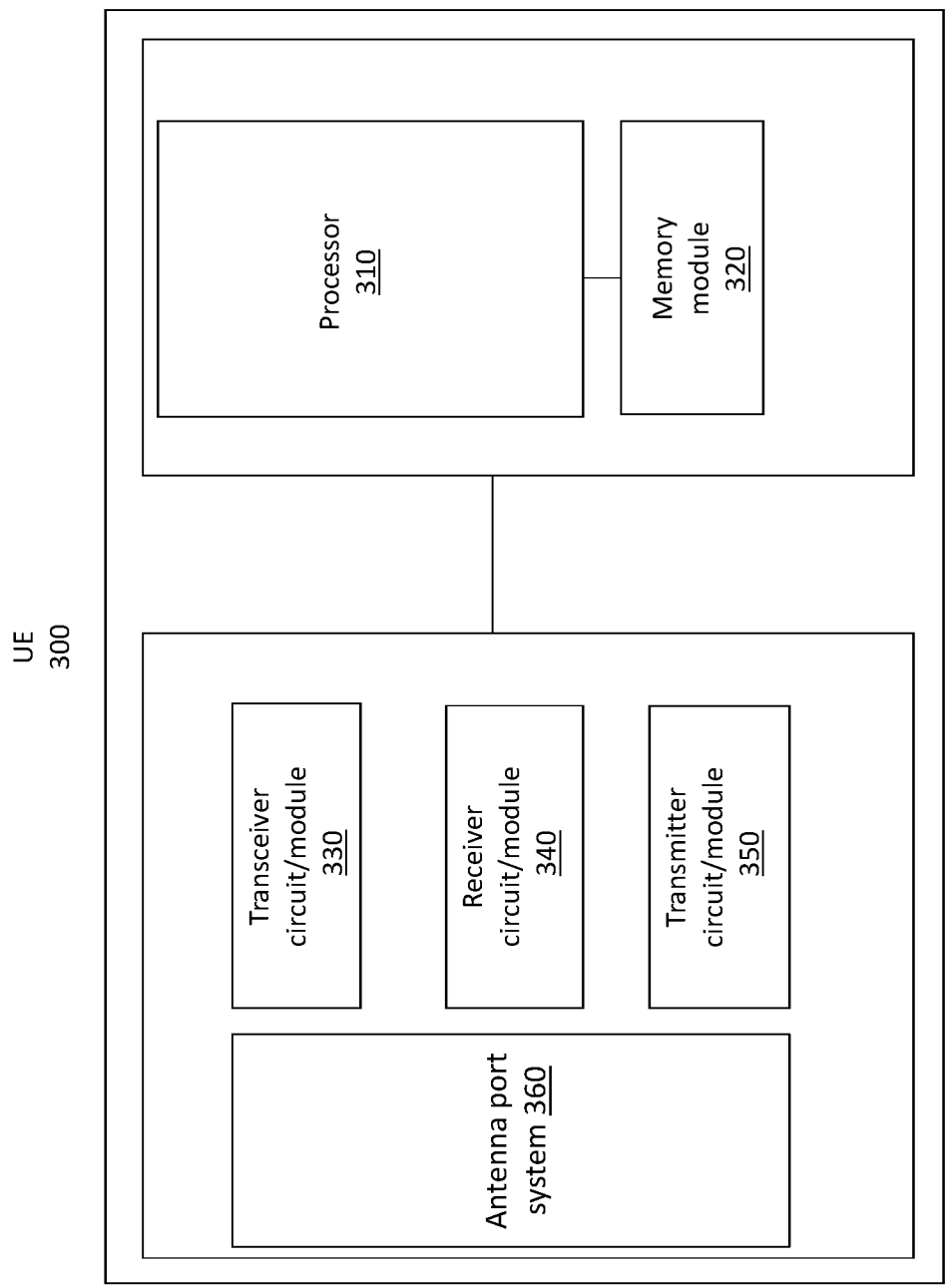
FIG. 3 is a block diagram depicting a UE (transmitter) according to exemplary embodiments herein.

In order to perform the previously described process or method steps related to the UE, some embodiments herein include a UE 300 as shown in FIG. 3, the UE 300 comprises a processor 310 or processing circuit or a processing module or a processor or means 310; a receiver circuit or receiver module 340; a transmitter circuit or transmitter module 330; a memory module 320 a transceiver circuit or transceiver module 330 which may include the transmitter circuit 370 and the receiver circuit 340. The UE 300 further comprises an antenna system 360, which includes antenna circuitry for transmitting and receiving signals to/from at least network nodes and other UEs etc.

The UE 300 may operate in any radio access technology including 2G, 3G, 4G or LTE, LTE-A, 5G, WLAN, and WiMax etc.

The processing module/circuit 310 includes a processor, microprocessor, an application specific integrated circuit (ASIC), field programmable gate array (FPGA), or the like, and may be referred to as the "processor 310." The processor 310 controls the operation of the UE 300 and its components. Memory (circuit or module) 320 includes a random access memory (RAM), a read only memory (ROM), and/or another type of memory to store data and instructions that may be used by processor 310. In general, it will be understood that the UE 300 in one or more embodiments includes fixed or programmed circuitry that is configured to carry out the operations in any of the embodiments disclosed herein.

In at least one such example, the UE 300 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein. Further, it will be appreciated that the UE 300 may comprise additional components not shown in FIG. 3. Details of the actions performed by the UE have already been disclosed and need not be repeated again.

There is also provided a computer program comprising instructions which when executed on at least one processor 310 of the UE 300, cause the processor 310 to carry out the method and actions according to previously described embodiments related to the UE. A carrier containing the computer program is also provided, wherein the carrier is one of a computer readable storage medium; an electronic signal, optical signal or a radio signal.

As previously described, there is also provided methods performed by the gNB (receiver) according to previously described embodiments.

The gNB is provided with a retransmission counter, CG-ReC, which is configured to count every failing data packet (i.e., the transmitters/are informed via the NACK messages or the NACK timers). The gNB may further comprise a retransmission assignment indicator (ReAI) which may be signaled.

According to an embodiment, the method performed by the network node (or gNB) may include indicating any of the schemes as per signaling or RRC configurations (broadcast as such or dedicated) or preconfigured by the network or network node. According to another embodiment, the method, by the gNB, may comprise selecting either schemes dynamically based on the modes of operations and the environment conditions.

The method may comprise indicating if the transmission is done with the "first approach" and the retransmission will take place in the same Configured Grants (where initial transmissions are indicated) or the retransmission takes place in new dynamic grants or new configured grants.

Additionally, the method may comprise: indicating if the transmission is done with the "second approach" and the retransmission will take place in the same Configured Grants (where initial transmissions are indicated) or the retransmission takes place in a new dynamic grant or new dynamic grants or new configured grants.

The method performed by the gNB may comprise, configuring the UE with the CG configuration in addition to the ReAI initialization. This may be configured during the CG RRC messages or adapted/set via Layer 1 (L1)-signaling (e.g., via DCI). According to an embodiment, the method may comprise configuring the length of the counter CG-ReC via e.g. RRC configuration to have one or more bits or is fixed as pre-configurations.

According to an embodiment, the method (for the non-handshaking case) may include requesting to the UE to perform an explicit retransmission with a new grant.

For the handshaking case, the method performed by the gNB may comprise incrementing the CG-ReC every time a received packet or data is decoded with uncorrectable errors.

The method may further comprises configuring the length of the counter CG-ReC. The method may further comprise incrementing the CG-ReC counter every time the gNB detects an uncorrectable error in a received packet and, at the same time, the receiver (gNB) intends to send a NACK back to the transmitter (UE). According to another embodiment, the method by the gNB comprises signaling in, e.g., the DCI, a signaling field (ReAI) comprising (partially or fully) the incremented CG-ReC value (in case of decoding errors) or the same previous counter value (in case of correct reception) to the transmitter (UE);

The method may further comprise comparing the received transmitter (UE) CG-ReC value (or derived counter value) from the ReAI received in, e.g., UL control information; and based on the receiver (gNB) internal CG-ReC and the transmitter (UE) conveyed CG-ReC value, performing a HARQ misalignment resolution in case of a mismatch of the two CG-ReC values.

When the UE and the gNB are configured to follow the handshaking procedure as previously described, the method performed by the gNB may comprise (if the first approach is selected) sending the ReAI, every ACK/NACK, where the ReAI counter is incremented every ACK and kept the same every NACK.

If the second approach is selected: the method may comprise sending the ReAI, every time the gNB transmits a NACK, a ReAI comprising the toggled/incremented CG-ReC. Additional operations performed by the gNB have already been described and need not be repeated again.

Figure 4:
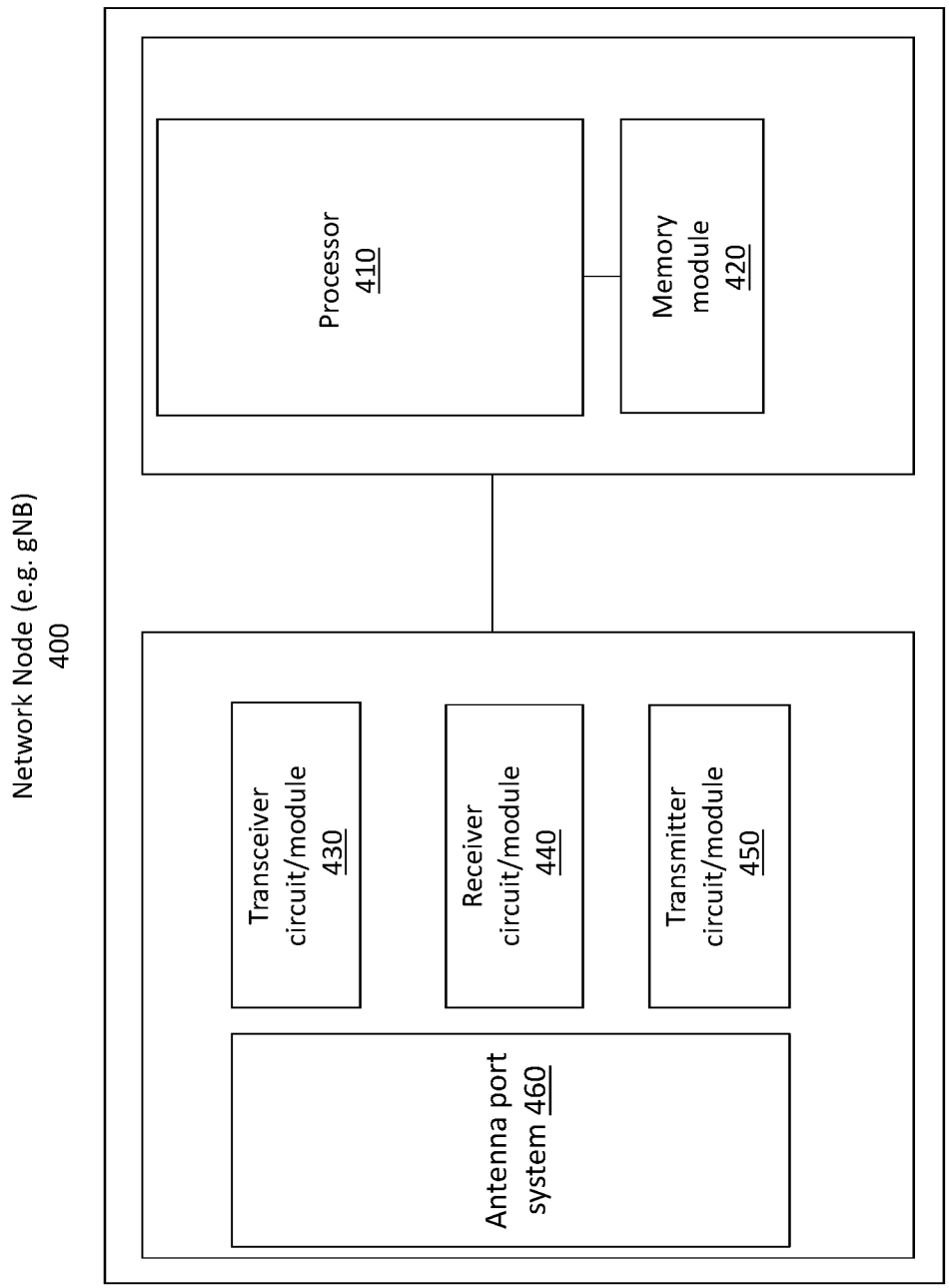
FIG. 4 is a block diagram depicting a network node (receiver or gNB) according to exemplary embodiments herein.

In order to perform the previously described process or method steps related to the UE, some embodiments herein include a receiver or gNB 400 as shown in FIG. 4, the gNB 400 comprises a processor 410 or processing circuit or a processing module or a processor or means 410; a receiver circuit or receiver module 440; a transmitter circuit or transmitter module 430; a memory module 420 a transceiver circuit or transceiver module 430 which may include the transmitter circuit 470 and the receiver circuit 440. The gNB 400 further comprises an antenna system 460, which includes antenna circuitry for transmitting and receiving signals to/from at least network nodes and UEs etc.

The gNB 400 may operate in any radio access technology including 2G, 3G, 4G or LTE, LTE-A, 5G, WLAN, and WiMax etc.

The processing module/circuit 410 includes a processor, microprocessor, an application specific integrated circuit (ASIC), field programmable gate array (FPGA), or the like, and may be referred to as the "processor 410." The processor 410 controls the operation of the gNB 400 and its components. Memory (circuit or module) 420 includes a random access memory (RAM), a read only memory (ROM), and/or another type of memory to store data and instructions that may be used by processor 410. In general, it will be understood that the gNB 400 in one or more embodiments includes fixed or programmed circuitry that is configured to carry out the operations in any of the embodiments disclosed herein.

In at least one such example, the gNB 400 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein. Further, it will be appreciated that the gNB 400 may comprise additional components not shown in FIG. 4. Details of the actions performed by the gNB have already been disclosed and need not be repeated again.

There is also provided a computer program comprising instructions which when executed on at least one processor 410 of the gNB 400, cause the processor 410 to carry out the method and actions according to previously described embodiments related to the gNB. A carrier containing the computer program is also provided, wherein the carrier is one of a computer readable storage medium; an electronic signal, optical signal or a radio signal.

The invention claimed is:

1. A method comprising:
changing a configured grant retransmission counter when a transmission of a first packet occurs, wherein the first packet comprises at least one transport blocks;
maintaining the configured grant retransmission counter if a retransmission or an incremental redundancy transmission of the first packet occurs, wherein the retransmission is due to channel failure, decoding failure, or Listen Before Talk failure;
changing the configured grant retransmission counter when a second packet is transmitted, wherein the second packet is different from the first packet;
changing the configured grant retransmission counter by at least one if a counting criteria is performed on a transport block level or based on a number of erroneous code block group (s); and
generating a retransmission assignment indicator signal, wherein the retransmission assignment indicator signal conveys the value of the configured grant retransmission counter or derives the criteria of which code block groups are erroneous or conveys which transport block are erroneous.

2. The method according to claim 1, wherein the retransmission assignment indicator comprises a content or a structure of the at least one code block groups of at least one transport blocks.

3. The method according to claim 1, further comprising performing retransmission on configured grants resources.

4. The method according to claim 1, comprising performing retransmission on dynamically allocated grants.

5. An apparatus comprising:
a configured grant retransmission counter,
a processor circuit; and
a memory circuit, wherein the memory is arranged to store instructions for the processor circuit,
wherein the processor circuit is arranged to change the configured grant retransmission counter when a new transmission of a first packet occurs,
wherein the first packet comprises at least one transport blocks;
wherein the processor circuit is arranged to maintain the configured grant retransmission counter unchanged if a retransmission or an incremental redundancy transmission of the first packet occurs, wherein the retransmission is due to channel failure, decoding failure, or Listen Before Talk failure;
wherein the processor circuit is arranged to change the configured grant retransmission counter when a transmission of a second packet is transmitted, wherein the second packet is different from the first packet;
wherein the processor circuit is arranged to change the configured grant retransmission counter by at least one if a counting criteria is performed on a transport block level or based on a number of erroneous code block group (s); and
wherein the processor circuit is arranged to generate a retransmission assignment indicator signal, wherein the retransmission assignment indicator signal conveys the value of the configured grant retransmission counter or derives the criteria of which code block groups are erroneous or conveys which transport block are erroneous.

6. The apparatus according to claim 5, wherein the retransmission assignment indicator comprises a content or a structure of the at least one code block groups of at least one transport blocks.

7. The apparatus according to claim 5, wherein the processor circuit is arranged to perform retransmission on configured grants resources.

8. The apparatus according to claim 5, wherein the processor circuit is arranged to perform retransmission on dynamically allocated grants.

9. A method comprising:
receiving a first packet from a apparatus, wherein the first packet comprises at least one transport blocks,
wherein the apparatus comprises a configured grant retransmission counter,
wherein the apparatus changes the configured grant retransmission counter when transmitting the first packet;
receiving the first packet from the apparatus,
wherein the configured grant retransmission counter is maintained in the apparatus if a retransmission or an incremental redundancy transmission of the first packet occurs,
wherein the reception of the first packet from the apparatus is due to channel failure, decoding failure, or Listen Before Talk failure;
receiving a second packet from the apparatus,
wherein the second packet is different from the first packet,
wherein the apparatus changes the configured grant retransmission counter
wherein the apparatus changes the configured grant retransmission counter by at least one if a counting criteria is performed on a transport block level or based on a number of erroneous code block group (s); and receiving a retransmission assignment indicator signal, wherein the retransmission assignment indicator signal conveys the value of the configured grant retransmission counter or derives the criteria of which code block groups are erroneous or conveys which transport block are erroneous.

10. The method according to claim 9, wherein the retransmission assignment indicator further comprises a content or a structure of the at least one code block groups of at least one transport blocks.

11. An apparatus comprising:
a processor circuit; and
a memory circuit, wherein the memory is arranged to store instructions for the processor circuit,
wherein the processor circuit is arranged to receive a first packet from a apparatus,
wherein the first packet comprises at least one transport blocks,
wherein the apparatus comprises a configured grant retransmission counter,
wherein the apparatus changes the configured grant retransmission counter when transmitting the packet,
wherein the processor circuit is arranged to receive the first packet from the apparatus,
wherein the configured grant retransmission counter is maintained in the apparatus if a retransmission or an incremental redundancy transmission of the first packet occurs,
wherein the reception of the first packet from the apparatus is due to channel failure, decoding failure, or Listen Before Talk failure;
wherein the processor circuit is arranged to receive a second packet from the apparatus,
wherein the second packet is different from the first packet,
wherein the apparatus changes the configured grant retransmission counter when the second packet is transmitted,
wherein the apparatus changes the configured grant retransmission counter by at least one depending on if a counting criteria is performed on a transport block level or based on a number of erroneous code block group (s),
wherein the processor circuit is arranged to receive a retransmission assignment indicator signal generated by the apparatus,
wherein the retransmission assignment indicator signal conveys the value of the configured grant retransmission counter or derives the criteria of which code block groups are erroneous or conveys which transport block are erroneous.

12. The receiver apparatus according to claim 11, wherein the retransmission assignment indicator further comprises a content or a structure of the at least one code block groups of at least one transport blocks.

13. A computer program stored on a non-transitory medium, wherein the computer program when executed on a processor performs the method as claimed in claim 1.

14. The computer program product according to claim 13, wherein the retransmission assignment indicator comprises a content or a structure of the one or more code block groups of at least one transport block.

15. The computer program product according to claim 13, wherein the method of claim 1 further comprises performing retransmission on configured grants resources.

16. The computer program product according to claim 13, wherein the method of claim 1 further comprises performing retransmission on dynamically allocated grants.

17. A computer program stored on a non-transitory medium, wherein the computer program when executed on a processor performs the method as claimed in claim 5.

18. The computer program product according to claim 17, wherein the retransmission assignment indicator comprises a content or a structure of the one or more code block groups of at least one transport block.

* * * * *